Nov. 13, 1934.    W. J. CRONAN    1,980,323
STEERING WHEEL SIGNAL OPERATING SWITCH
Original Filed March 9, 1928
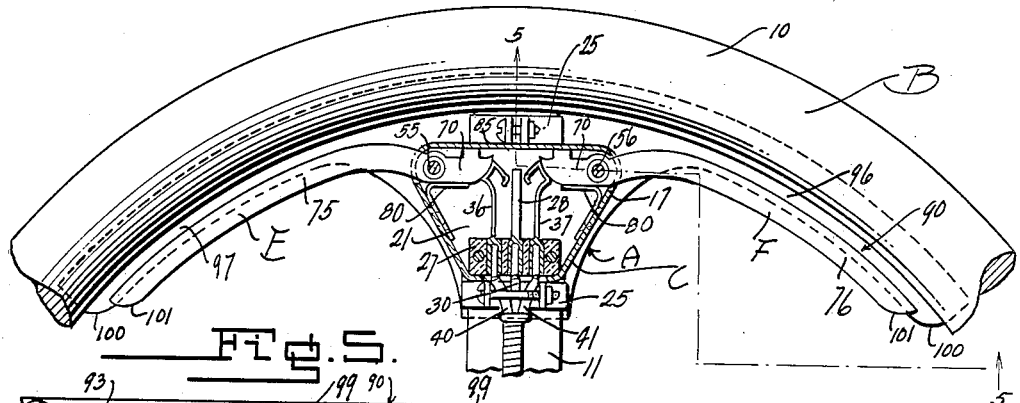
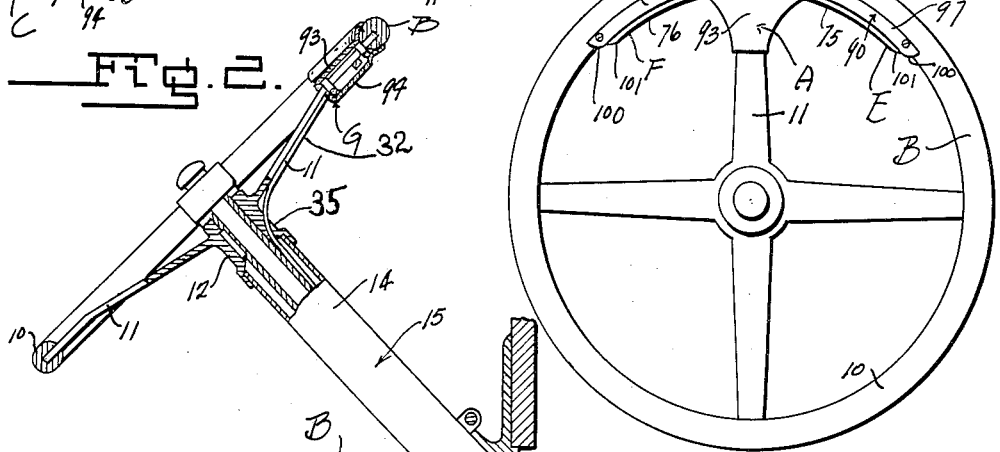
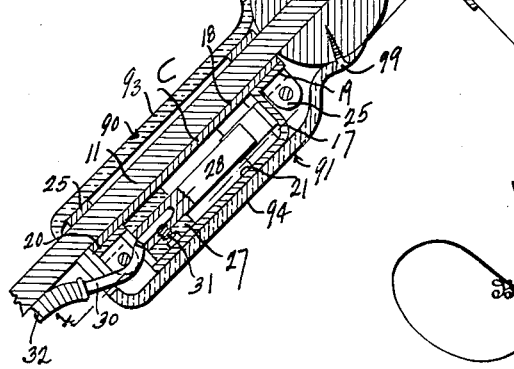
William J. Cronan
Inventor
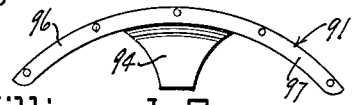
Attorneys Patented Nov. 13, 1934

1,980,323

UNITED STATES PATENT OFFICE 1,980,323

STEERING WHEEL SIGNAL OPERATING SWITCH

William J. Cronan, Wethersfield, Conn.

Application March 9, 1928, Serial No. 260,475
Renewed August 17, 1931

12 Claims. (Cl. 200—59)

This invention relates to improvements in switch mechanisms.

The primary object of the invention is the provision of an improved switch mechanism adapted to be associated with the steering wheel of an automobile or the like, in position that the same will not interfere with the normal grasp of an operator upon the wheel, but so positioned that the operator will grasp the switch and close the same when it is desired to make a right or left hand turn of the vehicle, for the purpose of operating direction indicating signals to inform traffic of the contemplated turn in direction.

More specifically the invention relates to that class of switch mechanism entirely carried by a vehicle steering wheel and whose contacts are closed the instant the operator clasps the wheel rim and switch operating means extending along the periphery of the wheel during the act of turning the car to the left or right.

A further object of my invention is to combine and simplify in one unit the two switch units fundamentally necessary for the control of electrically operated right and left hand direction indicating signals, the operating means being entirely carried by the steering wheel and actuated by the operators compressive clasp thereof prior to changing the course of the vehicle.

Another object is to provide a switch operating lever in combination with a steering wheel signal operating switch so leveraged and so designed that relatively slight effort and movement is required for the operation of the switch contact members so that the grasp of the operator prior to turning of the vehicle will operate the switch whether said lever or any portion thereof be forcibly grasped or slidably touched.

Another feature of importance is to provide in combination with a vehicle steering wheel including a rim and spokes, a unitary switch mechanism connected to the wheel along the line of one of the spoke members having right and left operating elements positioned on opposite sides of the said spoke member so that either element may be operated when the rim is grasped, providing thereby a simple installation which does not weaken or incumber the rim structure.

Other objects and advantages of this invention will be apparent during the course of the following detailed description.

In the accompanying drawing, wherein similar reference characters designate corresponding parts throughout the several views, Figure 1 is a fragmentary view, partly in section, showing a portion of the steering wheel rim and the improved switch mechanism in its associated relation therewith, the view being a bottom sectional view taken substantially on the line 1—1 of Figure 4.

Figure 2 is a view of a steering wheel and its post, partly in section, showing the location of the improved switch mechanism thereon.

Figure 3 is a plan view of a steering wheel, showing the inherent relation of the improved switch mechanism thereto.

Figure 4 is a sectional view taken through the improved switch mechanism radially of the steering wheel.

Figure 5 is a sectional view taken substantially on the line 5—5 of Figure 1.

Figure 6 is a view showing a section of the outer switch casing.

In the drawing, wherein for the purpose of illustration is shown only a preferred embodiment of the invention, the letter A may generally designate the improved switch mechanism, which includes a switch box C attachable to the steering wheel B having therein switch details including levers E and F. An outer casing construction G, attachable to the steering wheel B, encloses the switch box C and cooperates with the levers E and F in a novel relation.

The steering wheel B of course includes the ordinary circular rim 10, having spokes 11 connected with a hub portion 12 rotatable at the upper end of the stationary tube 14 of the steering post construction 15.

The switch mechanism A is associable with the part of the wheel B which is most remote from the driver during straight driving of the vehicle which is steered by the steering wheel. It is thus positioned to have it normally out of the way of the steering action, except when a right or left hand turn of the vehicle is contemplated, and the switch levers E and F are so positioned that they will be unconsciously grasped by the operator for a right or left hand turn of the vehicle, and thus they are in position normally to be grasped during such right or left turn, but not otherwise.

The switch box C includes the box body 17, best shown in Figures 1 and 4 of the drawing, having a cover 18 and end flanges 19 and 20. The switch box 17 thus provides a compartment 21 therein, and said switch box is positioned beneath one of the radial spokes 11, preferably the one most remote from the driver, and attached to this spoke by means of clamps 25 which embrace the spoke 11 and extend about the end flanges 19 and 20 for clamping the box 17 in the position shown in Figure 4.

Within the switch box compartment 21 is a hard rubber or insulation block 27, which supports a preferably stationary contact 28 embedded therein and extending along the compartment as shown in Figures 1 and 4 of the drawing. It has a wire 30 connected thereto as at 31; the wire 30 extending through a flexible conduit 32 which is arranged beneath the spoke 11 to which the switch box is attached; the flexible conduit 32 extending through the hub 12 of the steering wheel, as shown at 35 in Figure 2 of the drawing, so that the wire 30 passes downwardly inside of the stationary tube 14 of the steering post, and from thence to a terminal of a storage battery. Contacts 36 and 37 are also positioned upon the block 27, at opposite sides of the contact 28. The contacts 36 and 37 are flexible, that is, of spring material, and inherently spaced from the contact 28. The resiliency of these contacts 36 and 37 assists in keeping levers E and F in spaced relation to the rim 10. Wires 40 and 41 are respectively connected in conducting relation with the contacts 36 and 37 and extend from the switch box C into the flexible tubing 32, and at their opposite ends may be connected to suitable right and left signal lamps or signals of approved character, as can readily be understood. The remainder of the signal circuit may be wired in accordance with well understood practice, that is, the other terminals of the signal lights may be grounded, and the terminal of the storage battery to which the wire 30 is not connected may be grounded.

The levers E and F are pivoted upon pins 55 and 56 respectively, in opposite corners of the switch box. The pins 55 and 56 may be arranged as shown in Figure 5, that is, rigid with one portion of the switch box and having a bearing in an opposite end of the switch box, and receiving a preferably brass bushing 58 thereabout, upon which the lever E or F bears for pivotal movement. The levers E and F have a short portion 70 extending into the switch box compartment 21, for respective action against the head ends of the contacts 36 and 37. The opposite ends 75 and 76 of the levers E and F respectively are offset, as shown at 77 in Figure 5 of the drawing, and extended along the inside periphery of the steering wheel rim 10, within the plane of the steering wheel, in substantial parallelism with the inside periphery of the rim 10, as shown in Figure 1 of the drawing. Relatively small movement is required in the lever portions 75 or 76 to cause an engagement of the correlative blade 36 or 37 with the intermediate contact member 28. Thus it is to be noted that the switch will be operated by a slight touch of the lever portions 75 or 76, it not being necessary to grasp them forcibly or in any particular section. Springs 80 are positioned within the steering box C, and act against the ends 70 of the levers E and F, to normally force said ends to a stop engagement with an end wall 85 of the casing, so as to position the levers E and F in a slightly spaced relation at their arms 75 and 76 from the inside periphery of the rim 10. In this position the contacts 36 and 37 are out of engagement with the central contact 28, and the circuits are of course broken thru the signal lamps (not shown) connected with the terminals or contacts 36 and 37.

The outer casing G is provided to insure an accurate working of the switch mechanism without hampering the ordinary steering operation of the vehicle. It consists in the provision of upper and lower complementary housing sections 90 and 91 respectively, including the pocketed body portions 93 and 94 respectively, adapted to overlie the upper and lower sides of the spoke 11 on which the switch box C is attached; the portion 94 being pocketed to receive the switch box C therein, as shown in Figure 4 of the drawing. Guard flanges 96 and 97 extend to the left and right of each of the body portions 93 and 94, being concavo-convex in cross section to fit the surface of the steering wheel rim 10, along the inner periphery thereof; said guard arms 96 and 97 extending peripherally inwardly of the innermost periphery of the rim 10, as shown in Figure 1, and being spaced to receive the switch arms 75 and 76 therebetween. The springs 80 normally force the switch arm portions 75 and 76 a short distance beyond the concave peripheral edges of the guard flanges 96 and 97, as illustrated in Figures 1 and 3 of the drawing, in order that the said switch arms may be compressed for operating the contacts 36 and 37 against the contact 28. The arms 96 and 97 of the sections of the outer casing G are curved in length to conform to the arcuation of the steering rim 10, and are apertured for receiving screws 99 by means of which to attach the same in the position above described.

Referring to the operation, it can be understood from Figure 3, which is the relation of parts in which the operator of the vehicle views the steering wheel for driving straight ahead, that for normal operation of the vehicle the operator may grasp the side portions of the steering wheel in entirely unobstructed relation by the switch mechanism A, so that for normal straight driving and slight deviation therefrom, the switch mechanism A does not interfere in any particular with the driving operation. However, for a contemplated right or left hand turn, the driver ordinarily moves his or her hand upwardly along the wheel rim towards the top thereof, and if the turn is to the right the hand of the operator will grasp about the switch arm portion 75 of the control lever E, and press the same inwardly until the operator's fingers or hand comes into engagement with the concave edges of the guard arms or flanges 97 of the outer casing construction G. This limits the depressed movement of the switch arm E and prevents the arm E from coming into contact with the inner periphery of the rim B. However, the compression of the switch arm has been sufficient to cause an engagement of the contact 36 and 28 for bridging the circuit thru the right signal lamp to indicate to traffic in advance or in the rear of the vehicle the contemplated change in directional movement. For a left hand turn of the vehicle, the operation is exactly the same, except the wheel is grasped at the left side and the switch arm portion 76 is compressed for causing a bridging of the contacts 37 and 28 in order to signal the left hand turn.

The extreme end edges of the guard arms 96 and 97 are convexly arcuated at 100 so as not to interfere with the slipping of the operator's hands along the rim, and the extreme edges of the switch arm portions 75 and 76 are likewise convexed at 101, and spaced from ends 100, so as not to interfere with the slipping of the operator's hands along the steering wheel rim.

While the specific switch mechanism shown and described is deemed to be practical for attachment to a spoke of a steering wheel the switch mechanism may equally well be combined with the wheel as a built-in construction.

Various changes in the shape, size, and arrangement of parts may be made to the form of invention herein shown and described, without departing from the spirit of the invention or the scope of the claims.

I claim:

1. In combination with a vehicle steering column having a steering wheel attached therewith including spokes and a rim, a complete switch connected with a spoke of the steering wheel including a long movable operating member arcuately extending in substantial parallelism closely along the inner periphery of the rim in a position to be grasped and moved for closing the switch incident to a normal grasp of the vehicle steering wheel rim when making a turn of the vehicle.

2. In combination a steering wheel including a hub, spokes radiating from the hub and a rim carried by the spokes, a switch mechanism carried by a spoke having right and left operating levers pivotally associated with the switch and extending longitudinally in arcuate parallelism about the inner periphery of the rim in closely spaced relation therewith where the same may be naturally grasped by the operator when grasping the rim.

3. In combination a steering wheel including a hub, spokes radiating from the hub and a rim carried by the spokes, a switch mechanism carried by a spoke having right and left operating levers pivotally associated with the switch and extending longitudinally in arcuate parallelism about the inner periphery of the rim in spaced relation therewith where the same may be naturally grasped by the operator when grasping the rim, and elongated guard flanges carried by the rim above and below the operating levers and in such relation that a portion only of the operating levers extends from between said guard member whereby to limit the depressed movement of the levers when the rim is grasped by the operator.

4. In combination with a vehicle steering wheel including spokes and a rim joined to the spokes, a switch box connected with the wheel adjacent one of said junctures, contacts within the switch box normally disengaged, elongated movable operating levers carried by the switch box including arm portions extending from the switch box in opposite directions and in spaced close conformity along the rim, spring means actuating the operating levers so that they are normally retained in the last mentioned position and from which position they may be further depressed for engaging the switch contacts.

5. In combination with a steering wheel including a rim and spokes, a switch device connected with the spokes including an operating lever of elongated concavo-convex formation extending along in closely spaced conforming relation with the inner periphery of the rim, and guard means on the rim for preventing catching of an operator's fingers in said space or on the operating lever into sliding of the hand of the operator about the rim.

6. In combination with a steering wheel including spokes and a rim carried by the spokes, a switch box carried by a spoke adjacent to the inner periphery of the rim, contacts within the switch box normally disengaged and providing a pair of switches, a pair of movable operating levers pivoted to the switch box for operating said contacts, said levers including relatively long arcuated arm portions extending along the inner periphery of the rim in opposite directions from the pivots thereof on the switch box and in spaced close conformity along the inner periphery of the rim, and spring means operating on said levers to position them so that the pair of switches are opened and adapted to be closed upon depression of the arms of said levers incident to a normal grasp of the operator upon the rim of the wheel when making a turn.

7. In combination with a vehicle steering wheel including spokes and a rim carried by the spokes, a switch box connected with one of said spokes adjacent the inner periphery of the rim, a common contact within the switch box, a pair of movable contacts relatively disposed at opposite sides of the common contact and adapted to be individually engageable therewith to close independent circuits, a pair of opearting levers pivoted intermediate their ends to the switch box at opposite sides of said contacts including ends engageable with said movable contacts, the opposite end portions of said levers being arcuated and relatively longer extending relatively in opposite directions from the switch box at opposite sides of the spoke in paralleling conformity along the inner periphery of the rim and spaced therefrom to permit of independent operation of the levers for engaging said respective movable contacts with the common contact.

8. In combination with a vehicle steering wheel including intersecting spoke and rim portions, a switch having normally disengaged contacts connected to the wheel adjacent the intersection of one of the spoke members with the rim, and a pivotally mounted depressible operating member for said switch co-extending about the rim portion pressible therewith for engaging said contacts.

9. In combination with a vehicle steering wheel including spokes and a rim joined to the spokes, a switch mechanism comprising a compartment adjacent one of the said junctions, contact members within the compartment normally disengaged, depressible operating members associated with the compartment including portions extending therefrom in opposite directions along and within the rim where the same may be pressed for engaging the contact members.

10. In combination with a vehicle steering mechanism, including a steering wheel having confluent spoke and rim portions, a switch compartment carried by the wheel adjacent the confluence, a common contact member and opposed contact members mounted therein, and depressible means counterextending about the rim portion for effecting individual engagement of said common contact and an opposed contact.

11. In combination with a vehicle steering wheel, including spokes and a rim joined to the spokes, a switch box connected with the steering wheel adjacent the junction of a spoke and the rim, a common contact within the switch box, a pair of movable contacts relatively disposed at opposite sides of the common contact and adapted to be individually engageable therewith to close independent circuits, a pair of operating members pivoted intermediate their ends to the switch box including ends engageable with said movable contacts, the opposite end portions of said members being arcuated and relatively longer extending relatively in opposite directions from the switch box at opposite sides of the spoke in substantial parallelism along the rim and spaced therefrom to permit of independent operation of the operating members for engaging said respective movable contacts with the common contact.

12. In combination with a vehicle steering wheel including an axial hub, a circumferential rim and radial spokes extending from the hub and abutted upon the rim, a switch comprising a compartment adjacent one of said abutments, an insulating member mounted in said compartment, a plurality of normally disengaged contacts mounted on said insulating member, and opposed operating means associated with the compartment and extending along the rim in positions to be individually clasped compressibly by an operator for engaging a pair of said contacts.

WILLIAM J. CRONAN.